United States Patent
Wei et al.

(10) Patent No.: US 10,135,556 B2
(45) Date of Patent: Nov. 20, 2018

(54) SIGNAL TRANSMISSION METHOD, CONTROLLER, AND SIGNAL TRANSMISSION SYSTEM

(71) Applicant: Huawei Technologies Co., Ltd., Shenzhen (CN)

(72) Inventors: Wenxiong Wei, Hangzhou (CN); Yingchun Yang, Hangzhou (CN); Shuncheng Pan, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/835,963

(22) Filed: Dec. 8, 2017

(65) Prior Publication Data
US 2018/0109343 A1 Apr. 19, 2018

Related U.S. Application Data

(63) Continuation of application No. PCT/CN2015/081181, filed on Jun. 10, 2015.

(51) Int. Cl.
*H04J 14/00* (2006.01)
*H04J 3/06* (2006.01)
(Continued)

(52) U.S. Cl.
CPC .......... *H04J 3/0682* (2013.01); *H04B 10/40* (2013.01); *H04J 3/1694* (2013.01);
(Continued)

(58) Field of Classification Search
CPC ............ H04J 14/0212; H04Q 11/0005; H04Q 2011/0037; H04Q 2011/0039; H04Q 2011/0051
(Continued)

(56) References Cited

U.S. PATENT DOCUMENTS 5,812,290 A * 9/1998 Maeno ............... H04Q 11/0062
370/247
7,583,898 B1 9/2009 Dalton et al.
(Continued)

FOREIGN PATENT DOCUMENTS

CN 1691551 A 11/2005
CN 101043506 A 9/2007
(Continued)

OTHER PUBLICATIONS

Machine Translation and Abstract of Chinese Publication No. CN1691551, Nov. 2, 2005, 8 pages.
(Continued)

*Primary Examiner* — Kevin Kim
(74) *Attorney, Agent, or Firm* — Conley Rose, P.C.

(57) ABSTRACT

A signal transmission method includes receiving, by a controller, a request signal sent by a first transmitter. The method includes establishing, by the controller according to the request signal, a second optical path that connects the first transmitter to the second receiver in the optical switching network (OSN). The method includes sending, by the controller, to the second receiver according to the request signal, a reset signal used to instruct the second receiver to be reset to an initial state. The method includes sending, by the controller, an acknowledgement signal to the first transmitter. The acknowledgment signal is used to instruct the first transmitter to send, by using the second optical path, an optical signal to the second receiver.

15 Claims, 8 Drawing Sheets

(51) Int. Cl.
*H04B 10/40* (2013.01)
*H04J 3/16* (2006.01)
*H04L 25/06* (2006.01)
*H04Q 11/00* (2006.01)

(52) U.S. Cl.
CPC ....... *H04L 25/062* (2013.01); *H04Q 11/0067* (2013.01); *H04J 2203/0067* (2013.01); *H04Q 2011/0079* (2013.01)

(58) Field of Classification Search
USPC .......................................................... 398/45
See application file for complete search history.

(56) References Cited

U.S. PATENT DOCUMENTS

| | | | |
|---|---|---|---|
| 8,565,226 B1 * | 10/2013 | Zhang | ................ H04Q 11/0001 370/252 |
| 2003/0206744 A1 | 11/2003 | Doh et al. | |
| 2008/0187312 A1 | 8/2008 | Kazawa et al. | |
| 2010/0014866 A1 | 1/2010 | Kang et al. | |
| 2010/0321072 A1 | 12/2010 | Bauwelinck et al. | |
| 2014/0112339 A1 | 4/2014 | Safranek et al. | |
| 2015/0180507 A1 | 6/2015 | Willey et al. | |

FOREIGN PATENT DOCUMENTS

| | | |
|---|---|---|
| CN | 101163078 A | 4/2008 |
| CN | 101222359 A | 7/2008 |
| CN | 101237282 A | 8/2008 |
| CN | 101316139 A | 12/2008 |
| CN | 104335196 A | 2/2015 |
| EP | 2395725 A1 | 12/2011 |

OTHER PUBLICATIONS

Machine Translation and Abstract of Chinese Publication No. CN101043506, Sep. 26, 2007, 10 pages.
Machine Translation and Abstract of Chinese Publication No. CN101163078, Apr. 16, 2008, 7 pages.
Machine Translation and Abstract of Chinese Publication No. CN101222359, Jul. 16, 2008, 12 pages.
Machine Translation and Abstract of Chinese Publication No. CN101316139, Dec. 3, 2008, 13 pages.
Foreign Communication From a Counterpart Application, PCT Application No. PCT/CN2015/081181, English Translation of International Search Report dated Mar. 16, 2016, 3 pages.
Foreign Communication From a Counterpart Application, PCT Application No. PCT/CN2015/081181, English Translation of Written Opinion dated Mar. 16, 2016, 6 pages.
Foreign Communication From a Counterpart Application, European Application No. 15894615.2, Extended European Search Report dated Jun. 15, 2018, 8 pages.

* cited by examiner

SIGNAL TRANSMISSION METHOD, CONTROLLER, AND SIGNAL TRANSMISSION SYSTEM

CROSS-REFERENCE TO RELATED APPLICATIONS

This application is a continuation of International Application No. PCT/CN2015/081181, filed on Jun. 10, 2015, the disclosure of which is hereby incorporated by reference in its entirety.

TECHNICAL FIELD

Embodiments of the present disclosure relate to the communications field, and to a signal transmission method, a controller, and a signal transmission system.

BACKGROUND

In an optical switching network system, multiple transmitters (Tx) and receivers (Rx) are connected to each other by means of an optical switching network (OSN). An optical path between a transmitter and a receiver changes as the OSN switches. A transmission mode between the transmitter and the receiver is a burst transmission mode. The transmitter and the receiver that operate in the burst transmission mode are referred to as a burst transmitter and a burst receiver. A signal transmitted in the burst transmission mode may be referred to as a burst.

It is assumed that in a current state of an OSN, an optical path is established between a transmitter Tx1 and a receiver Rx1, and Tx1 sends a burst to Rx1. At a next moment, the OSN is switched in status: the optical path between the transmitter Tx1 and the receiver Rx1 is disconnected, an optical path between a transmitter Tx4 and the receiver Rx1 is established, and the transmitter Tx4 sends a burst to the receiver Rx1. However, before the status of the OSN is switched, the receiver Rx1 is in a state of receiving a burst sent by the transmitter Tx1. Therefore, a parameter setting of the receiver Rx1 is still for receiving a burst sent by Tx1. Only when the receiver Rx1 is reset to an initial state, the receiver Rx1 can effectively receive a new signal (a burst sent by Tx4).

In the prior art, a detection module is usually disposed on a side of a receiver. When the detection module detects a signal from a new transmitter, the receiver is triggered and reset to an initial state. It can be learned that, in the prior art, the receiver can be triggered and reset to an initial state only after the signal sent by the transmitter reaches the receiver. Consequently, it takes a relatively long response time for the receiver to effectively receive a new signal, and utilization of an OSN is relatively low.

SUMMARY

Embodiments of the present disclosure provide a signal transmission method, a controller, and a signal transmission system, so as to send a reset signal to a receiver in a timely manner, and effectively shorten a response time of receiving a new signal by the receiver.

According to a first aspect, a signal transmission method is provided, where the method is applied to an optical transmission system, the optical transmission system includes an OSN and a controller that is configured to control the OSN, a first optical path that connects a first transmitter to a first receiver exists in the OSN, and the method includes: receiving, by the controller, a request signal sent by the first transmitter, where the request signal is used to request to send an optical signal to a second receiver; establishing, by the controller according to the request signal, by controlling an optical switch in the OSN, a second optical path that connects the first transmitter to the second receiver in the OSN; sending, by the controller to the second receiver according to the request signal, a reset signal used to instruct the second receiver to be reset to an initial state; and sending, by the controller after or while sending the reset signal, an acknowledgement signal to the first transmitter, where the acknowledgement signal is used to instruct the first transmitter to send, by using the second optical path, an optical signal to the second receiver.

With reference to the first aspect, in a first possible implementation of the first aspect, the establishing, by the controller according to the request signal, a second optical path by changing a status of an optical switch in the OSN includes establishing, by the controller, the second optical path when the controller determines that the second optical path is idle.

With reference to the first aspect or the first possible implementation of the first aspect, in a second possible implementation of the first aspect, the sending, by the controller to the second receiver according to the request signal, a reset signal used to instruct the second receiver to be reset to an initial state includes sending, by the controller according to the request signal, the reset signal to a reset port of a limited amplifier (LA) of the second receiver.

With reference to the second possible implementation of the first aspect, in a third possible implementation of the first aspect, the sending, by the controller to the second receiver according to the request signal, a reset signal used to instruct the second receiver to be reset to an initial state includes sending, by the controller according to the request signal, the reset signal to a reset port of a trans-impedance amplifier (TIA) and/or a reset port of clock and data recovery (CDR) of the second receiver.

With reference to the first aspect or the first possible implementation of the first aspect, in a fourth possible implementation of the first aspect, the sending, by the controller to the second receiver according to the request signal, a reset signal used to instruct the second receiver to be reset to an initial state includes sending, by the controller according to the request signal, the reset signal to a reset signal generator of the second receiver.

With reference to the first aspect and the foregoing implementation of the first aspect, in a fifth implementation of the first aspect, the method further includes disconnecting, by the controller according to the request signal, the first optical path by controlling an optical switch in the OSN.

With reference to the first aspect and the foregoing implementation of the first aspect, in a sixth implementation of the first aspect, the second receiver is a burst receiver that uses direct current coupling.

According to a second aspect, a controller is provided, where the controller is applied to an optical transmission system, the optical transmission system includes an OSN, the controller is configured to control the OSN, a first optical path that connects a first transmitter to a first receiver exists in the OSN, and the controller includes: a receiving module, configured to receive a request signal sent by the first transmitter, where the request signal is used to request to send an optical signal to a second receiver; an optical path establishment module, configured to establish, according to the request signal received by the receiving module, by controlling an optical switch in the OSN, a second optical path that connects the first transmitter to the second receiver in the OSN; and a sending module, configured to send, to the second receiver according to the request signal received by the receiving module, a reset signal used to instruct the second receiver to be reset to an initial state, where the sending module is further configured to: send, after or while sending the reset signal, an acknowledgement signal to the first transmitter, where the acknowledgement signal is used to instruct the first transmitter to send, by using the second optical path, an optical signal to the second receiver.

With reference to the second aspect, in a first possible implementation of the second aspect, the optical path establishment module is configured to establish the second optical path when it is determined that the second optical path is idle.

With reference to the second aspect or the first possible implementation of the second aspect, in a second possible implementation of the second aspect, the sending module is configured to send, according to the request signal, the reset signal to a reset port of an LA of the second receiver.

With reference to the second possible implementation of the second aspect, in a third possible implementation of the second aspect, the sending module is configured to send, according to the request signal, the reset signal to a reset port of a TIA and/or a reset port of a CDR of the second receiver.

With reference to the second aspect or the first possible implementation of the second aspect, in a fourth possible implementation of the second aspect, the sending module is configured to send, according to the request signal, the reset signal to a reset signal generator of the second receiver.

With reference to the second aspect and the foregoing implementation of the second aspect, in a fifth implementation of the second aspect, the controller further includes: an optical path disconnection module, configured to disconnect, according to the request signal, the first optical path by controlling an optical switch in the OSN.

With reference to the second aspect and the foregoing implementation of the second aspect, in a sixth implementation of the second aspect, the second receiver is a burst receiver that uses direct current coupling.

According to a third aspect, a signal transmission system is provided, including an OSN, where a first optical path that connects a first transmitter to a first receiver exists in the OSN; and a controller, configured to control the OSN, where the controller is configured to: receive a request signal sent by the first transmitter, where the request signal is used to request to send an optical signal to a second receiver; establish, according to the request signal, by controlling an optical switch in the OSN, a second optical path that connects the first transmitter to the second receiver in the OSN; send, to the second receiver according to the request signal, a reset signal used to instruct the second receiver to be reset to an initial state; and send, after or while sending the reset signal, an acknowledgement signal to the first transmitter, where the acknowledgement signal is used to instruct the first transmitter to send, by using the second optical path, an optical signal to the second receiver.

With reference to the third aspect, in a first possible implementation of the third aspect, the controller is configured to establish the second optical path when determining that the second optical path is idle.

With reference to the third aspect or the first possible implementation of the third aspect, in a second possible implementation of the third aspect, the controller is specifically configured to send, according to the request signal, the reset signal to a reset port of an LA of the second receiver.

With reference to the second possible implementation of the third aspect, in a third possible implementation of the third aspect, the controller is configured to send, according to the request signal, the reset signal to a reset port of a TIA and/or a reset port of a CDR of the second receiver.

With reference to the third aspect or the first possible implementation of the third aspect, in a fourth possible implementation of the third aspect, the controller is configured to send, according to the request signal, the reset signal to a reset signal generator of the second receiver.

With reference to the third aspect and the foregoing implementation of the third aspect, in a fifth implementation of the third aspect, the controller is further configured to disconnect, according to the request signal, the first optical path by controlling an optical switch in the OSN.

With reference to the third aspect and the foregoing implementation of the third aspect, in a sixth implementation of the third aspect, the at least one transmitter is a burst transmitter, and the at least two receivers are burst receivers that use direct current coupling.

Based on the foregoing technical solutions, in the embodiments of the present disclosure, a controller of an OSN sends, to a receiver according to a request signal that is sent by a transmitter and that is used to request to send an optical signal to the receiver, a reset signal used to instruct the receiver to be reset to an initial state; and sends, after or while sending the reset signal, to the transmitter, an acknowledgement signal used to instruct to send an optical signal to the receiver, thereby sending the reset signal to a second receiver in a timely manner, so that the receiver is reset to an initial state before receiving the optical signal sent by the transmitter. Therefore, a response time of receiving a new optical signal by the receiver is effectively shortened, and utilization of the OSN is improved.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following clearly and describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to a network-on-chip system and an OSN system, and may be further applied to the following communications systems, for example, a wavelength division multiplexing (WDM) system, a mode division multiplexing (MDM) system, a frequency division multiplexing (FDM) system, a time division multiplexing (TDM) system, and a few mode fiber (FMF) communications system.

Figure 1:
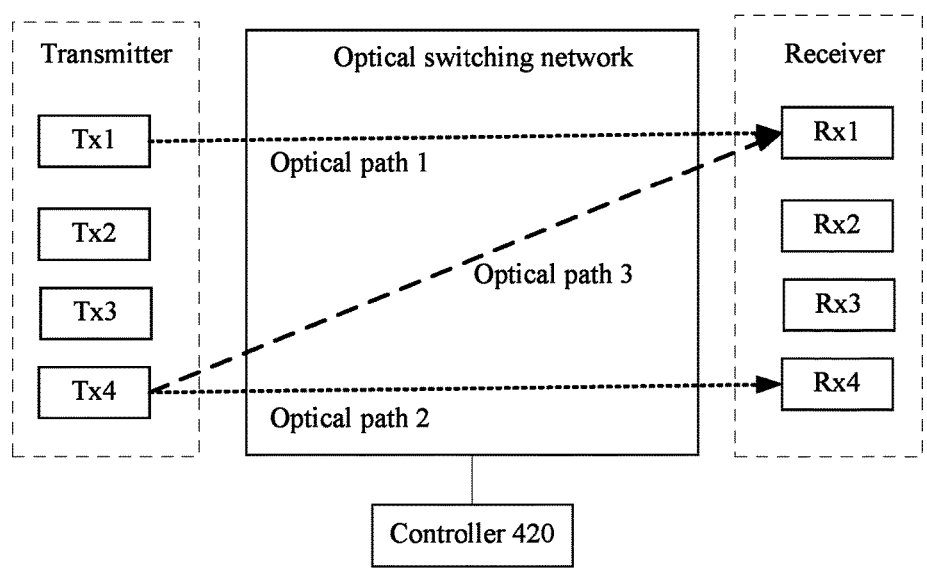
FIG. 1 is a schematic diagram of a scenario of an embodiment of the present disclosure.

As shown in FIG. 1, it is assumed that in a current state of an OSN, in the OSN, an optical path 1 that connects a transmitter Tx1 to a receiver Rx1 is established, and an optical path 2 that connects a transmitter Tx4 to a receiver Rx4 is established. For example, the transmitter Tx1 sends a burst to the receiver Rx1 by using the optical path 1, and the transmitter Tx4 sends a burst to the receiver Rx4 by using the optical path 2. At a next moment, if the transmitter Tx4 changes to send a burst to the receiver Rx1, an optical path 3 between the transmitter Tx4 and the receiver Rx1 is established in the OSN, and the transmitter Tx4 sends a burst to the receiver Rx1 by using the optical path 3. However, before the transmitter Tx4 sends a burst to the receiver Rx1 by using the optical path 3, the receiver Rx1 is in a state of receiving a burst sent by the transmitter Tx1. Therefore, a parameter of the receiver Rx1 is still set for receiving a burst sent by Tx1. It should be understood that, the receiver Rx1 can effectively receive a new signal (that is, a burst sent by Tx4) only when the receiver Rx1 is reset to an initial state. After the receiver Rx1 is reset to an initial state, a state of Rx1 is changed by continuously adjusting the parameter setting according to a received signal that is sent by Tx4, and finally Rx1 is changed into a state of receiving a signal sent by Tx4. In this case, a signal sent by Tx4 can be effectively received. In the prior art, a detection module is usually added to the receiver Rx1, and an action of resetting the receiver Rx1 to an initial state is triggered only when the detection module detects a new signal (which is different from a signal previously received by Rx1). That is, in the prior art, an action of resetting Rx1 is triggered only after an optical signal sent by Tx4 reaches the receiver Rx1. Therefore, a relatively long period of time (the period of time is referred to as a response time of receiving a new signal in the following) needs to pass from a time point when the receiver Rx1 finishes receiving a burst of Tx1 to a time point when the receiver Rx1 effectively receives a burst sent by Tx4. In this period of time, Tx4 cannot send valid data to Rx1, and a longer period of required time indicates lower utilization of the OSN.

For the foregoing problem, the present disclosure provides a signal transmission method, a controller, and a system that are based on an OSN.

Figure 2:
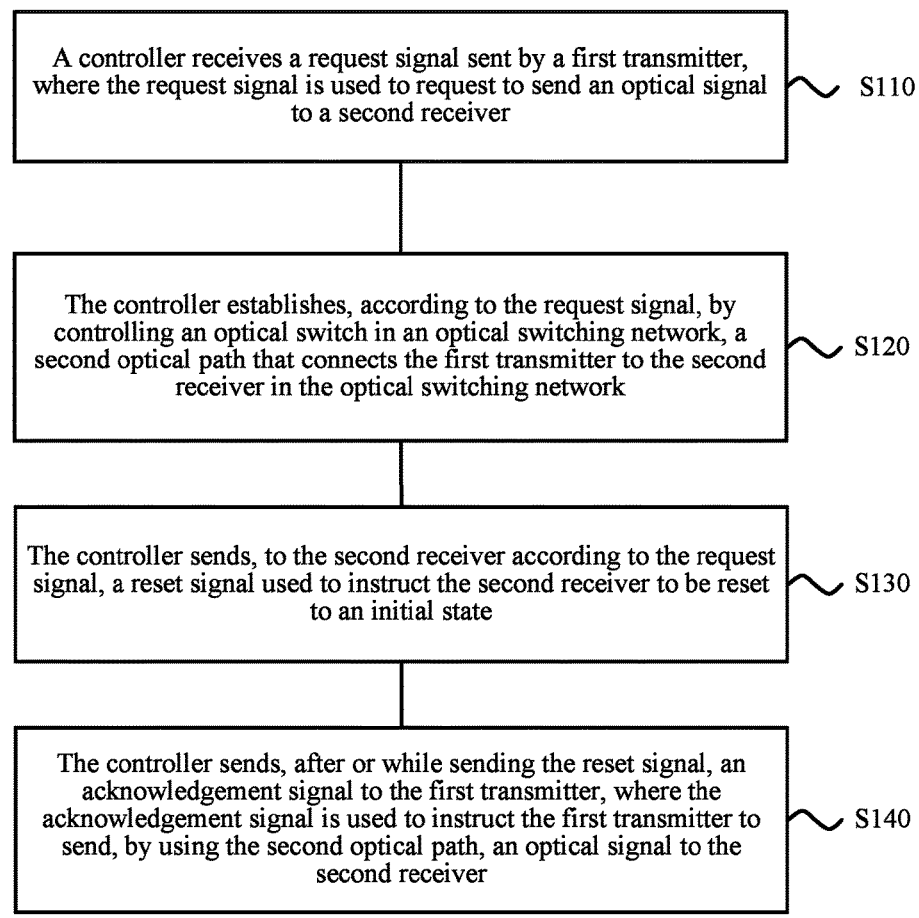
FIG. 2 is a schematic flowchart of a signal transmission method according to an embodiment of the present disclosure.

FIG. 2 is a schematic flowchart of a signal transmission method 100 according to an embodiment of the present disclosure. The method is applied to an optical transmission system. The optical transmission system includes an OSN and a controller that is configured to control the OSN. A first optical path that connects a first transmitter to a first receiver exists in the OSN. The method 100 is performed by, for example, the controller of the OSN. The method 100 includes the following steps.

S110: The controller receives a request signal sent by the first transmitter, where the request signal is used to request to send an optical signal to a second receiver.

For example, the first transmitter is Tx4 shown in FIG. 1, the first receiver is Rx4 shown in FIG. 1, the second receiver is Rx1 shown in FIG. 1, and the first optical path is, for example, an optical path 2 that connects the transmitter Tx4 to the receiver Rx4 in the OSN shown in FIG. 1.

It should be understood that, an optical path (an optical path 3 shown in FIG. 1) that connects the first transmitter Tx4 to the second receiver Rx1 in the OSN is not switched on, for example, all optical switches in the optical path 3 are not closed. Therefore, when needing to send an optical signal to the second receiver Rx1, the first transmitter Tx4 sends, to the controller, a request signal that is used to request to establish an optical path between the first transmitter Tx4 and the second receiver Rx1, to send an optical signal to the second receiver.

S120: The controller establishes, according to the request signal, by controlling an optical switch in the OSN, a second optical path that connects the first transmitter to the second receiver in the OSN.

It should be understood that, the OSN generally includes multiple 2×2 optical switches, each of which has two ingresses and two egresses. A configuration relationship between two ingresses and corresponding egresses of an optical switch may be changed by applying a signal such as a voltage signal, a current signal, or a thermal signal to the optical switch. For example, two ingresses of a 2×2 optical switch are respectively an input 1 and an input 2, and two egresses are respectively an output 1 and an output 2. It is assumed that an original configuration relationship between the two ingresses and the two corresponding egresses is: an optical signal that enters the optical switch from the input 1 exits from the output 1, and at the same time, an optical signal that enters the optical switch from the input 2 exits from the output 2. It is assumed that, at a moment, for example, a voltage signal is applied to the optical switch, so that a configuration relationship between the two ingresses and the two egresses is changed into: an optical signal that enters the optical switch from the input 1 exits from the output 2, and at the same time, an optical signal that enters the optical switch from the input 2 exits from the output 1.

It should be further understood that, in an OSN, by controlling the state of one optical switch, more optical switches, or all optical switches at a moment, an optical path through which an optical signal enters from an ingress and exits from an egress in the OSN may be changed. It should be further understood that, an ingress of the OSN is connected to a transmitter, and an egress is connected to a receiver, and therefore, if an optical path from the ingress of the OSN to the egress of the OSN is changed, an optical path from the transmitter to the receiver is also changed.

In this embodiment of the present disclosure, for example, based on the foregoing principle, the second optical path (the optical path 3 shown in FIG. 1) that connects the first transmitter Tx4 to the second receiver Rx4 in the OSN may be established by controlling an optical switch in the OSN.

S130: The controller sends, to the second receiver according to the request signal, a reset signal used to instruct the second receiver to be reset to an initial state.

The controller sends, to the second receiver, the reset signal that is used to instruct the second receiver to be reset to an initial state. It should be understood that, in an initial state, the receiver can continuously adjust a parameter setting according to a received new optical signal, and finally determine a parameter setting for the new optical signal, and then can effectively receive new optical signals.

S140: The controller sends, after or while sending the reset signal, an acknowledgement signal to the first transmitter, where the acknowledgement signal is used to instruct the first transmitter to send, by using the second optical path, an optical signal to the second receiver.

Therefore, in this embodiment of the present disclosure, the controller establishes, according to a request signal that is sent by the first transmitter and that is used to request to send an optical signal to the second receiver, and by controlling an optical switch in the OSN, a second optical path that connects the first transmitter to the second receiver in the OSN; sends, to the second receiver according to the request signal, a reset signal used to instruct the second receiver to be reset to an initial state; and sends, while or after sending the reset signal, to the first transmitter, an acknowledgement signal used to instruct the first transmitter to send an optical signal to the second receiver by using the second optical path, thereby sending the reset signal to the second receiver in a timely manner, so that the second receiver is reset before receiving an optical signal sent by the first transmitter. Therefore, a response time of receiving a new optical signal by the second receiver can be effectively shortened, and utilization of the OSN is improved.

It should be understood that, in this embodiment of the present disclosure, an optical signal that is sent by a transmitter to a receiver may be referred to as a burst.

It should be further understood that, in this embodiment of the present disclosure, before sending the request signal, the first transmitter may be in a state of sending an optical signal to the first receiver, or may be in a state of not sending an optical signal to any receiver. This is not limited in this embodiment of the present disclosure.

It should be further understood that, in this embodiment of the present disclosure, there is no strict order relationship between S120 and S130. For example, after receiving the request signal sent by the first transmitter, the controller may first send the reset signal to the second receiver, and then establish, by controlling the optical switch, the second optical path that connects the first transmitter to the second receiver in the OSN; or may first establish the second optical path according to the request signal, and then send the reset signal to the second receiver. This is not limited in this embodiment of the present disclosure.

It should be noted that, S140 is performed after S120. That is, when determining that a second optical path is established between the first transmitter and the second receiver, the controller sends an acknowledgement signal to the first transmitter, to instruct the first transmitter to send an optical signal to the second receiver by using the second optical path.

It should be further understood that, the OSN may include various types of optical switches. For OSNs including different types of optical switches, optical path establishment manners may be different. A description in S120 in the foregoing is merely used as an example rather than a limitation. Preferably, the OSN in this embodiment of the present disclosure may be an optical network including optical switches having a switching speed being less than 1 microsecond such as silicon photonic switches and lithium niobate switches driven by an electro-optic effect.

Optionally, in this embodiment of the present disclosure, in S120, the establishing, by the controller according to the request signal, by controlling an optical switch in the OSN, a second optical path that connects the first transmitter to the second receiver in the OSN includes the following step.

S121: When determining that the second optical path is idle, the controller establishes, by controlling an optical switch in the OSN, a second optical path that connects the first transmitter to the second receiver in the OSN.

After receiving a request that is sent by the first transmitter and that is used to request to send an optical signal to the second receiver, the controller first determines whether the second optical path that connects the first transmitter to the second receiver in the OSN is occupied, that is, whether the second optical path conflicts with another optical path in the OSN. When it is determined that the second optical path is not occupied, the second optical path is established by controlling an optical switch in the OSN.

It should be understood that, before the controller receives the request signal from the first transmitter, the second optical path that connects the first transmitter to the second receiver in the OSN is unnecessarily a through path. For example, an optical switch in the second optical path may be opened, that is, the second optical path cannot transmit an optical signal. The controller enables, according to the request signal, the second optical path to become a through path by controlling an optical switch in the OSN. In this case, the second optical path is established, and the first transmitter and the second receiver may transmit an optical signal by using the second optical path.

In this embodiment of the present disclosure, the controller establishes the second optical path in the OSN by controlling an optical switch in the OSN. The controller may directly control the optical switch, or may indirectly control the optical switch. For example, the controller may send a control signal to the OSN, where the control signal is used to control the optical switch to establish the second optical path; or may send a trigger signal to the OSN, where the trigger signal is used to trigger a control module of the OSN to control the optical switch to establish the second optical path.

It should be understood that, in this embodiment of the present disclosure, the controller establishes, according to the request signal, the second optical path in the OSN by controlling the optical switch in the OSN. The controller may send, to the OSN, a control signal that is used to establish the second optical path.

Optionally, in this embodiment of the present disclosure, in S120, the establishing, by the controller according to the request signal, by controlling an optical switch in the OSN, a second optical path that connects the first transmitter to the second receiver in the OSN includes: sending, by the controller according to the request signal, a control signal to the OSN, where the control signal is used to control an optical switch in the OSN to establish the second optical path that connects the first transmitter to the second receiver in the OSN.

The control signal sent by the controller to the OSN may be directly used to control an optical switch, for example, adjust a configuration relationship between an ingress and an egress that are of an optical switch to establish the second optical path. The control signal sent by the controller to the OSN may be further used as a trigger signal used to trigger control over an optical switch in the OSN. For example, the OSN includes a control circuit, and the control circuit receives a control signal sent by the controller and controls a corresponding optical switch to establish the second optical path.

Optionally, in this embodiment of the present disclosure, when determining that the second optical path connecting the first transmitter to the second receiver is idle, the controller sends, to the second receiver, a reset signal used to instruct the second receiver to be reset to an initial state.

In this embodiment of the present disclosure, the controller sends, to the second receiver, a reset signal used to instruct the second receiver to be reset to an initial state, and the controller sends the reset signal according to a request signal sent by the first transmitter, thereby ensuring accuracy of the reset signal. In addition, in this embodiment of the present disclosure, by means of an advantage that a controller exists in the OSN, a reset signal required by the second receiver is provided by the controller, thereby properly and fully using the existing device. Compared with that a signal detection module is additionally disposed in the receiver to trigger a reset signal in the prior art, this embodiment of the present disclosure effectively reduces device costs.

Optionally, in this embodiment of the present disclosure, the method 100 further includes the following step.

S150: The controller disconnects, according to the request signal, the first optical path by controlling an optical switch in the OSN.

The controller may disconnect, after or while establishing, the second optical path that connects the first transmitter to the second receiver in the OSN, the first optical path between the first transmitter and the first receiver, for example, open an optical switch in the first optical path.

Figure 3:
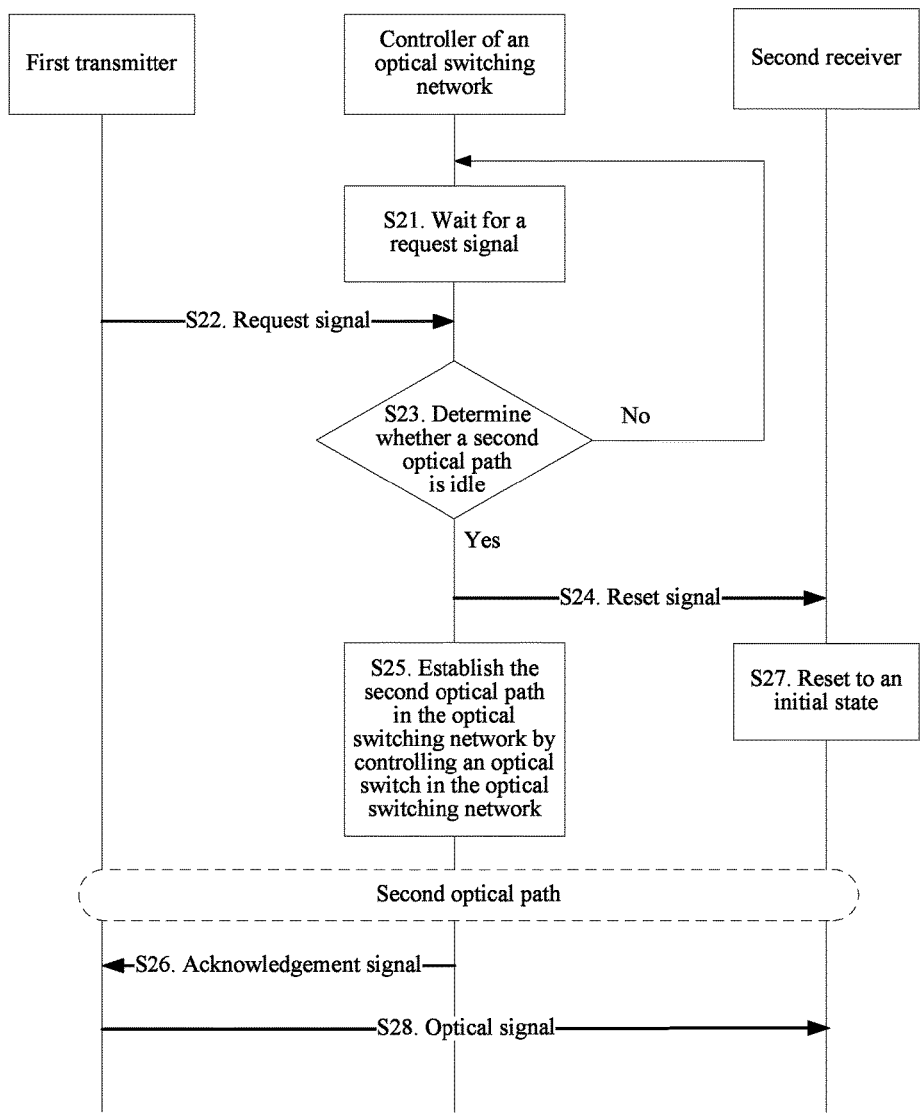
FIG. 3 is another schematic flowchart of a signal transmission method according to an embodiment of the present disclosure.

FIG. 3 is another schematic flowchart of a signal transmission method according to an embodiment of the present disclosure. In S21, a controller in an OSN waits for a request signal from a transmitter. In S22, the controller receives the request signal that is from the first transmitter and that is used to request to send an optical signal to a second receiver, and in this case, a first optical path that connects the first transmitter to a first receiver is established in the OSN. In S23, the controller determines whether a second optical path that connects the first transmitter to the second receiver in the OSN is idle. If it is determined that the second optical path is idle, go to S24, S25, and S26, or if it is determined that the second optical path is not idle, for example, the second optical path conflicts with another optical path in the OSN, go to S21. In S24, the controller sends, to the second receiver, a reset signal that is used to instruct the second receiver to be reset to an initial state. In S25, the controller establishes the second optical path in the OSN by controlling an optical switch in the OSN. In S26, the controller sends, to the first transmitter, an acknowledgement signal used to instruct the first transmitter to send an optical signal to the second receiver by using the second optical path. In S27, the second receiver is reset to an initial state according to the reset signal. In S28, the first transmitter sends, according to the acknowledgement signal, an optical signal to the second receiver by using the second optical path.

In this embodiment of the present disclosure, an order of S24 and S25 is not limited, but S26 is performed after S24 and S25.

It should be further understood that, after determining that transmission of the optical signal between the first transmitter and the second receiver is finished, the controller restores to a state of waiting for a request signal from a transmitter end, that is, go to S21 after S28.

Figure 4:
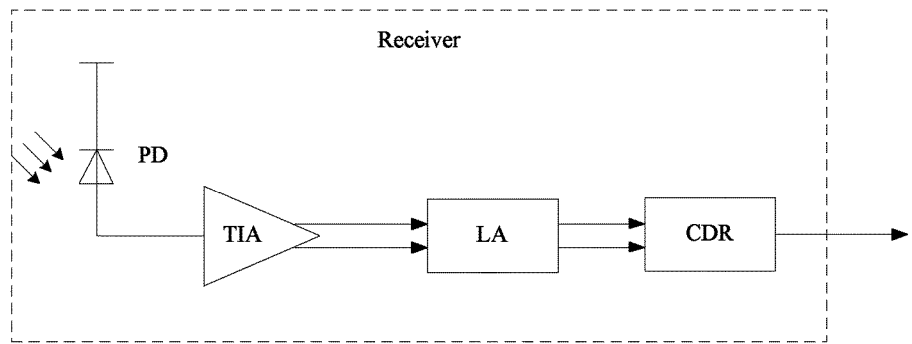
FIG. 4 is a schematic block diagram of a receiver according to an embodiment of the present disclosure.

FIG. 4 is a schematic block diagram of a receiver according to an embodiment of the present disclosure. As shown in FIG. 4, the receiver includes: a photo detector (PD), configured to receive an optical signal and convert the optical signal into a photocurrent, where the PD is a photodiode; a TIA configured to convert a current output by the PD into a voltage signal, and output the voltage signal, where the TIA is a head amplifier; an LA configured to amplify the voltage signal output by the TIA to a voltage signal having an even output level; and a CDR configured to recover a clock and recover data.

A major process of receiving an optical signal by the receiver is: in step 1, a received optical signal is converted into an electrical signal (which corresponds to a function of the PD); in step 2, the electrical signal is amplified to a standard signal level (which corresponds to a function of the TIA and a function of the LA), and in addition, a clock of the signal needs to be recovered (which corresponds to a function of the CDR).

In step 2, the process of amplifying, by the receiver, the electrical signal to the signal of the standard level includes first-stage amplification (generally performed by the TIA) and second-stage amplification (generally performed by the LA). In the first-stage amplification, a signal is amplified by selecting different amplification rates. For example, the TIA has three ranges (or more ranges or less ranges) of amplification rates: a high rate, an intermediate rate, and a low rate. A signal is amplified sequentially in descending order of amplification rates. For example, the signal is amplified first by using a high rate, and if an amplified signal exceeds a threshold, the amplification rate is adjusted to an intermediate rate, and the rest can be deduced by analog, until an amplified signal does not exceed the threshold. In the second-stage amplification, an amplification rate is continuously fed back by detecting a maximum value and a minimum value of a signal. Generally, the LA records a maximum value and a minimum value of a currently detected signal.

With reference to a scenario shown in FIG. 1, it is assumed that before receiving a signal (a signal 2) sent by Tx4, Rx1 is in a state of receiving a signal (a signal 1) sent by Tx1. Therefore, parameter settings of a TIA, an LA, and CDR of Rx1 are all for the signal 1. For example, an amplification rate of the TIA of Rx1 is set to a range of an intermediate rate (it is assumed that amplification rates of the TIA of Rx1 include three ranges: a high rate, an intermediate rate, and a low rate), and the LA of Rx1 stores a maximum value and a minimum value of the signal 1, and the CDR of Rx1 recovers a clock of the signal 1. In this case, if Rx1 receives the signal 2 sent by Tx4, but Rx1 cannot successfully perform the foregoing operation in step 2 on the signal 2, that is, Rx1 cannot effectively receive the signal 2, Rx1 needs to be reset to restoring to an initial state. That is, the amplification rate of the TIA of Rx1 is reset to a high rate, a historical record in the LA of Rx1 is cleared, and the CDR of Rx1 is initialized, so as to effectively receive a new signal (for example, the signal 2 in this example).

Therefore, when the receiver needs to receive a new signal, the receiver needs to be reset to an initial state. The LA of the receiver needs to be reset, that is, a historical record of the LA needs to be cleared; the TIA of the receiver needs to be reset, that is, the amplification rate of the TIA needs to be reset to a highest range of the amplification rates; and in addition, the CDR of the receiver needs to be initialized.

It should be understood that, resetting the receiver includes resetting the LA of the receiver, or further includes resetting the TIA or the CDR. In this embodiment of the present disclosure, the controller may be connected to a reset port of the LA of the receiver, so that the reset signal is sent to the reset port of the LA of the receiver, to reset the receiver; the controller may be further connected to a reset port of the TIA and a reset port of the CDR, so as to directly send the reset signal to the reset port of the TIA and the reset port of the CDR of the receiver, to reset the receiver; or the controller may be connected to a reset signal generator of the receiver, so as to input, by using the reset signal generator of the receiver, the reset signal to the reset port of the TIA, the reset port of the LA, and the reset port of the CDR. This is not limited in this embodiment of the present disclosure.

Optionally, in this embodiment of the present disclosure, in S130, the sending, by the controller to the second receiver according to the request signal, a reset signal used to instruct the second receiver to be reset to an initial state includes the following step.

S131: The controller sends, according to the request signal, the reset signal to a reset port of an LA of the second receiver.

The controller is connected to the reset port of the LA of the second receiver, to send the reset signal to the reset port of the LA of the second receiver.

Optionally, in this embodiment of the present disclosure, in S130, the sending, by the controller to the second receiver according to the request signal, a reset signal used to instruct the second receiver to be reset to an initial state includes the following step.

S132: The controller sends, according to the request signal, the reset signal to a reset port of a TIA and/or a reset port of CDR of the second receiver.

Specifically, the controller is connected to the reset port of the TIA and/or the reset port of the CDR of the second receiver, so as to send the reset signal to the reset port of the TIA and/or the reset port of the CDR of the second receiver.

Optionally, in this embodiment of the present disclosure, in S130, the sending, by the controller to the second receiver according to the request signal, a reset signal used to instruct the second receiver to be reset to an initial state includes the following step.

S133: The controller sends, according to the request signal, the reset signal to a reset signal generator of the second receiver.

The controller is connected to the reset signal generator of the second receiver, and sends, by using the reset signal generator, the reset signal to the second receiver.

Therefore, in this embodiment of the present disclosure, the controller sends, according to a request signal sent by the transmitter, a reset signal to the second receiver; and sends, after or while sending the reset signal, an acknowledgement signal to the transmitter, so that the second receiver is, when receiving an optical signal sent by the transmitter, reset to an initial state, thereby effectively shortening a time interval at which the second receiver receives signals sent by different transmitters, that is, shortening a response time of receiving a new signal, and further improving utilization of an OSN. In addition, the reset signal is generated by the controller of the OSN and sent to the receiver, thereby ensuring reliability of the reset signal. In addition, in this embodiment of the present disclosure, a reset signal is sent to the second receiver by using the controller existing in the OSN, and the second receiver can be reset to an initial state in a timely manner without need to perform extra detection, and therefore, device costs are low.

Optionally, in this embodiment of the present disclosure, the second receiver is a direct current coupling burst receiver.

It should be understood that, compared with an ordinary receiver, when a burst receiver needs to successively receive optical signals from different transmitters, the direct current coupling burst receiver can finish signal receiving in a relatively short time. This is mainly characterized in that a TIA and an LA can amplify the signals more quickly, and CDR can recover clocks more quickly.

It should be further understood that, the direct current coupling burst receiver is relative to an alternating current coupling burst receiver. No capacitor is connected between the TIA and the LA of the direct current coupling burst receiver (which is shown in FIG. 4), and when receiving signals transmitted by different transmitters, the direct current coupling burst receiver does not filter out direct current parts of the signals, and therefore, a signal processing speed is relatively fast.

Therefore, in this embodiment of the present disclosure, the controller establishes, according to a request signal that is sent by the first transmitter and that is used to request to send an optical signal to the second receiver, by controlling an optical switch in the OSN, a second optical path that connects the first transmitter to the second receiver in the OSN; sends, to the second receiver according to the request signal, a reset signal used to instruct the second receiver to be reset to an initial state; and sends, while or after sending the reset signal, to the first transmitter, an acknowledgement signal used to instruct the first transmitter to send an optical signal to the second receiver by using the second optical path, so that the second receiver is reset to an initial state before receiving an optical signal sent by the first transmitter. Therefore, a response time of receiving a new optical signal by the second receiver can be effectively shortened, and utilization of the OSN is improved.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In the foregoing, the method according to this embodiment of the present disclosure is described from the perspective of the controller. In the following, methods according to embodiments of the present disclosure are described separately from the perspective of a transmitter and the perspective of a receiver.

Figure 5:
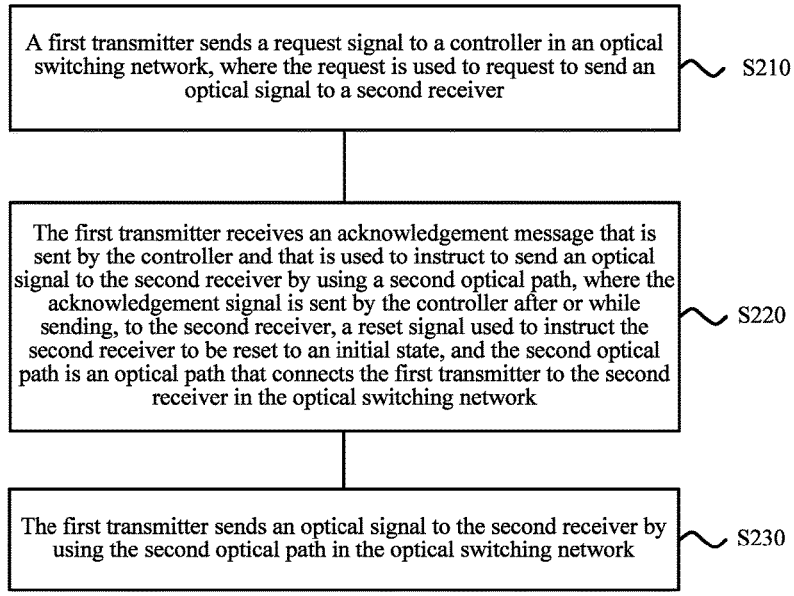
FIG. 5 is still another schematic flowchart of a signal transmission method according to an embodiment of the present disclosure.

FIG. 5 is a schematic flowchart of a signal transmission method 200 according to an embodiment of the present disclosure. The method is applied to an optical transmission system. The optical transmission system includes an OSN and a controller that is configured to control the OSN. A first optical path that connects a first transmitter to a first receiver exists in the OSN. The method may be performed by, for example, the first transmitter. As shown in FIG. 5, the method 200 includes the following steps.

S210: The first transmitter sends a request signal to the controller, where the request signal is used to request to send an optical signal to a second receiver.

S220: The first transmitter receives an acknowledgement signal that is sent by the controller and that is used to instruct the first transmitter to send an optical signal to the second receiver by using a second optical path, where the acknowledgement signal is sent by the controller after or while sending, to the second receiver, by the controller, a reset signal used to instruct the second receiver to be reset to an initial state, and the second optical path is an optical path that connects the first transmitter to the second receiver in the OSN.

S230: The first transmitter sends an optical signal to the second receiver by using the second optical path in the OSN.

Refer to the foregoing description of the method 100, and for concision, details are not described herein again.

Specifically, after the first transmitter receives an acknowledgement signal sent by the controller, it indicates that a second optical path between the first transmitter and the second receiver is established in the OSN, and therefore, the first transmitter sends a signal to the second receiver by using the second optical path. The controller sends, after or while sending a reset signal to the second receiver, an acknowledgement signal to the first transmitter. Therefore, before the signal sent by the first transmitter reaches the second receiver, the second receiver is reset to an initial state of effectively receiving the signal sent by the first transmitter, thereby effectively improving signal transmission efficiency.

Optionally, in this embodiment of the present disclosure, the method 200 further includes the following step.

S240: When having not received the acknowledgement signal, the first transmitter continues to send the request signal to the controller.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In the following, a signal transmission method according to an embodiment of the present disclosure is described from the perspective of a receiver.

Figure 6:
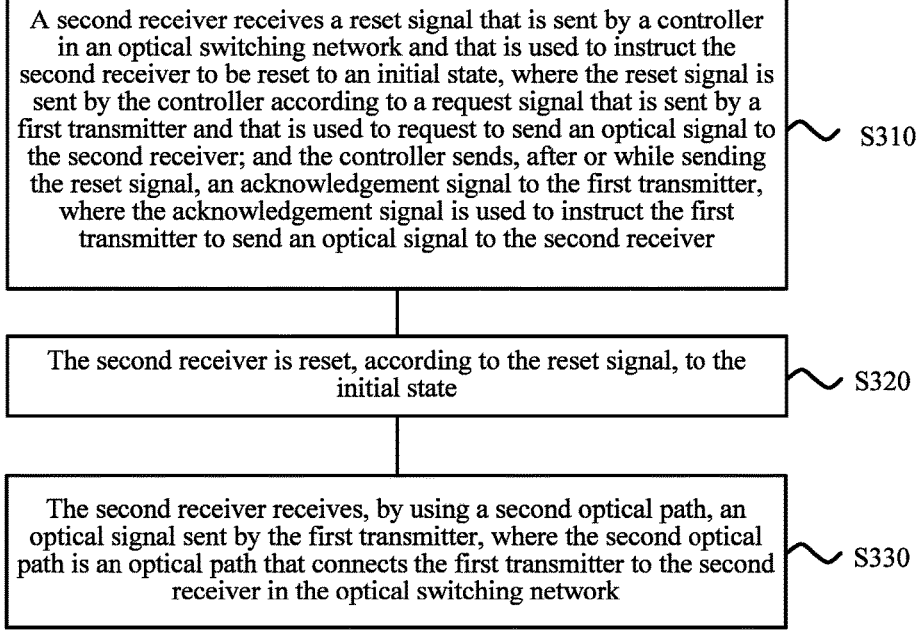
FIG. 6 is still another schematic flowchart of a signal transmission method according to an embodiment of the present disclosure.

FIG. 6 is a schematic flowchart of a signal transmission method 300 based on an OSN according to an embodiment of the present disclosure. The method is applied to an optical transmission system. The optical transmission system includes an OSN and a controller that is configured to control the OSN. A first optical path that connects a first transmitter to a first receiver exists in the OSN. The method may be performed by, for example, a second receiver. The method 300 includes the following steps.

S310: The second receiver receives a reset signal that is sent by the controller and that is used to instruct the second receiver to be reset to an initial state, where the reset signal is sent by the controller according to a request signal that is sent by the first transmitter and that is used to request to send an optical signal to the second receiver; and the controller sends, after or while sending the reset signal, an acknowledgement signal to the first transmitter, where the acknowledgement signal is used to instruct the first transmitter to send an optical signal to the second receiver.

S320: The second receiver is reset, according to the reset signal, to an initial state.

S330: The second receiver receives, by using a second optical path, an optical signal sent by the first transmitter, where the second optical path is an optical path that connects the first transmitter to the second receiver in the OSN.

Therefore, in this embodiment of the present disclosure, before receiving an optical signal sent by a transmitter, a receiver has been reset according to a reset signal sent by a controller, and can rapidly and effectively receive the optical signal sent by the transmitter, that is, the receiver is reset to an initial state in a timely manner, thereby effectively shortening a response time of receiving a new optical signal by the receiver, and further improving utilization of an OSN.

The receiver in this embodiment of the present disclosure is shown in FIG. 4, and is described in the foregoing, and details are not described herein again.

Optionally, in this embodiment of the present disclosure, in S310, the receiving, by the second receiver, a reset signal that is sent by the controller in the OSN and that is used to instruct the second receiver to be reset to an initial state includes receiving, by the second receiver, the reset signal by using a reset port of an LA.

The controller is connected to the reset port of the LA of the second receiver, to send the reset signal to the reset port of the LA of the second receiver.

Optionally, in this embodiment of the present disclosure, in S310, the receiving, by the second receiver, a reset signal that is sent by the controller in the OSN and that is used to instruct the second receiver to be reset to an initial state includes receiving, by the second receiver, the reset signal by using a reset port of a TIA and/or a reset port of CDR.

The controller is connected to the reset port of the TIA and/or the reset port of the CDR of the second receiver, so as to send the reset signal to the reset port of the TIA and/or the reset port of the CDR of the second receiver.

Optionally, in this embodiment of the present disclosure, in S310, the receiving, by the second receiver, a reset signal that is sent by the controller in the OSN and that is used to instruct the second receiver to be reset to an initial state includes receiving, by the second receiver, the reset signal by using a reset signal generator of the second receiver.

The controller is connected to the reset signal generator of the second receiver, and sends, by using the reset signal generator, the reset signal to the second receiver.

A process is consistent with the foregoing descriptions in the method 100, and for concision, details are not described again.

Therefore, in this embodiment of the present disclosure, before receiving an optical signal sent by a transmitter, a receiver has been reset according to a reset signal sent by a controller, and can rapidly and effectively receive the optical signal sent by the transmitter, that is, the receiver is reset to an initial state in a timely manner, thereby effectively shortening a response time of receiving a new optical signal by the receiver, and further improving utilization of an OSN.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In the foregoing, with reference to FIG. 1 to FIG. 6, the signal transmission methods based on the OSN according to the embodiments of the present disclosure are described in detail. In the following, with reference to FIG. 7 and FIG. 8, controllers according to embodiments of the present disclosure are described.

Figure 7:
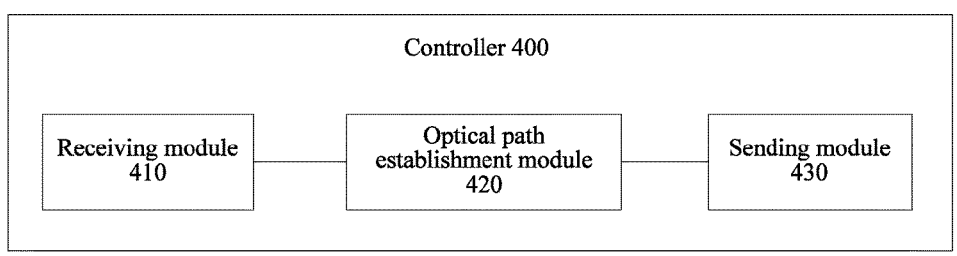
FIG. 7 is a schematic block diagram of a controller according to an embodiment of the present disclosure.

FIG. 7 is a schematic block diagram of a controller 400 according to an embodiment of the present disclosure. The controller is applied to an optical transmission system, the optical transmission system includes an OSN, the controller is configured to control the OSN, and a first optical path that connects a first transmitter to a first receiver exists in the OSN. The controller includes: a receiving module 410, configured to receive a request signal sent by the first transmitter, where the request signal is used to request to send an optical signal to a second receiver; an optical path establishment module 420, configured to establish, according to the request signal received by the receiving module, by controlling an optical switch in the OSN, a second optical path that connects the first transmitter to the second receiver in the OSN; and a sending module 430, configured to send, to the second receiver according to the request signal received by the receiving module, a reset signal used to instruct the second receiver to be reset to an initial state, where the sending module 430 is further configured to: send, after or while sending the reset signal, an acknowledgement signal to the first transmitter, where the acknowledgement signal is used to instruct the first transmitter to send, by using the second optical path, an optical signal to the second receiver.

Therefore, in this embodiment of the present disclosure, the controller establishes, according to a request signal that is sent by the first transmitter and that is used to request to send an optical signal to the second receiver, by controlling an optical switch in the OSN, a second optical path that connects the first transmitter to the second receiver in the OSN; sends, to the second receiver according to the request signal, a reset signal used to instruct the second receiver to be reset to an initial state; and sends, while or after sending the reset signal, to the first transmitter, an acknowledgement signal used to instruct the first transmitter to send an optical signal to the second receiver by using the second optical path, thereby sending the reset signal to the second receiver in a timely manner, so that the second receiver is reset to an initial state before receiving an optical signal sent by the first transmitter. Therefore, a response time of receiving a new optical signal by the second receiver can be effectively shortened, and utilization of the OSN is improved.

Optionally, in this embodiment of the present disclosure, the optical path establishment module is configured to establish the second optical path when it is determined that the second optical path is idle.

It should be understood that, the receiver in this embodiment of the present disclosure is shown in FIG. 4, and is described in the foregoing, and details are not described herein again.

Optionally, in this embodiment of the present disclosure, the sending module is configured to send, according to the request signal, the reset signal to a reset port of a limited amplifier LA of the second receiver.

The controller is connected to the reset port of the LA of the second receiver, to send the reset signal to the reset port of the LA of the second receiver.

Optionally, in this embodiment of the present disclosure, the sending module is configured to send, according to the request signal, the reset signal to a reset port of a TIA and/or a reset port of CDR of the second receiver.

The controller is connected to the reset port of the TIA and/or the reset port of the CDR of the second receiver, so as to send the reset signal to the reset port of the TIA and/or the reset port of the CDR of the second receiver.

Optionally, in this embodiment of the present disclosure, the sending module is configured to send, according to the request signal, the reset signal to a reset signal generator of the second receiver.

The controller is connected to the reset signal generator of the second receiver, and sends, by using the reset signal generator, the reset signal to the second receiver.

Optionally, in this embodiment of the present disclosure, the controller further includes: an optical path disconnection module, configured to disconnect, according to the request signal, the first optical path by controlling an optical switch in the OSN.

Optionally, in this embodiment of the present disclosure, the second receiver is a burst receiver that uses direct current coupling.

Therefore, in this embodiment of the present disclosure, the controller establishes, according to a request signal that is sent by the first transmitter and that is used to request to send an optical signal to the second receiver, by controlling an optical switch in the OSN, a second optical path that connects the first transmitter to the second receiver in the OSN; sends, to the second receiver according to the request signal, a reset signal used to instruct the second receiver to be reset to an initial state; and sends, while or after sending the reset signal, to the first transmitter, an acknowledgement signal used to instruct the first transmitter to send an optical signal to the second receiver by using the second optical path, thereby sending the reset signal to the second receiver in a timely manner, so that the second receiver is reset to an initial state before receiving an optical signal sent by the first transmitter. Therefore, a response time of receiving a new optical signal by the second receiver can be effectively shortened, and utilization of the OSN is improved.

It should be understood that, the signal transmission controller 400 based on the OSN according to this embodiment of the present disclosure may correspond to the controller of the OSN in the signal transmission method according to the embodiments of the present disclosure. In addition, the foregoing and other operations and/or functions of the modules of the controller 400 are respectively for implementing corresponding processes of methods from FIG. 1 to FIG. 6. For concision, details are not described herein again.

Figure 8:
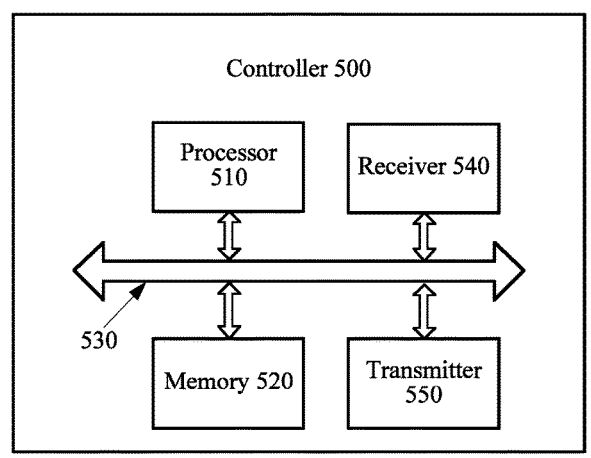
FIG. 8 is another schematic block diagram of a controller according to an embodiment of the present disclosure.

As shown in FIG. 8, an embodiment of the present disclosure further provides a controller 500, where the controller 500 is applied to an optical transmission system, the optical transmission system includes an OSN, the controller is configured to control the OSN, and a first optical path that connects a first transmitter to a first receiver exists in the OSN. The controller 500 includes a processor 510, a memory 520, a bus system 530, a receiver 540, and a transmitter 550. The processor 510, the memory 520, the receiver 540, and the transmitter 550 are connected by using the bus system 530. The memory 520 is configured to store an instruction. The processor 510 is configured to execute the instruction stored in the memory 520, to control the receiver 540 to receive a signal, and control the transmitter 550 to send a signal. The receiver 540 is configure to receive a request signal sent by the first transmitter, where the request signal is used to request to send an optical signal to a second receiver; the processor 510 is configured to establish, according to the request signal, by controlling an optical switch in the OSN, a second optical path that connects the first transmitter to the second receiver in the OSN; and the transmitter 550 is configured to send, to the second receiver according to the request signal, a reset signal used to instruct the second receiver to be reset to an initial state; and send, after or while sending the reset signal, an acknowledgement signal to the first transmitter, where the acknowledgement signal is used to instruct the first transmitter to send, by using the second optical path, an optical signal to the second receiver.

Therefore, in this embodiment of the present disclosure, the controller establishes, according to a request signal that is sent by the first transmitter and that is used to request to send an optical signal to the second receiver, by controlling an optical switch in the OSN, a second optical path that connects the first transmitter to the second receiver in the OSN; sends, to the second receiver according to the request signal, a reset signal used to instruct the second receiver to be reset to an initial state; and sends, while or after sending the reset signal, to the first transmitter, an acknowledgement signal used to instruct the first transmitter to send an optical signal to the second receiver by using the second optical path, thereby sending the reset signal to the second receiver in a timely manner, so that the second receiver is reset to an initial state before receiving an optical signal sent by the first transmitter. Therefore, a response time of receiving a new optical signal by the second receiver can be effectively shortened, and utilization of the OSN is improved. Optionally, in this embodiment of the present disclosure, the processor 510 is configured to establish the second optical path when it is determined that the second optical path is idle.

It should be understood that, the receiver in this embodiment of the present disclosure is shown in FIG. 4, and is described in the foregoing, and details are not described herein again.

Optionally, in this embodiment of the present disclosure, the transmitter 550 is specifically configured to send, according to the request signal, the reset signal to a reset port of an LA of the second receiver.

The transmitter 550 is connected to the reset port of the LA of the second receiver.

Optionally, in this embodiment of the present disclosure, the transmitter 550 is configured to send, according to the request signal, the reset signal to a reset port of a TIA and/or a reset port of CDR of the second receiver.

The transmitter 550 is connected to the reset port of the TIA and/or the reset port of the CDR of the second receiver.

Optionally, in this embodiment of the present disclosure, the transmitter 550 is configured to send, according to the request signal, the reset signal to a reset signal generator of the second receiver.

The transmitter 550 is connected to the reset signal generator of the second receiver.

Optionally, in this embodiment of the present disclosure, the processor 510 is specifically configured to disconnect, according to the request signal, the first optical path by controlling an optical switch in the OSN.

Optionally, in this embodiment of the present disclosure, the second receiver is a burst receiver that uses direct current coupling.

It should be understood that in this embodiment of the present disclosure, the processor 510 may be a central processing unit (CPU), or the processor 510 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor may be any conventional processor or the like.

The memory 520 may include a read-only memory (ROM) and a random access memory (RAM), and provides an instruction and data to the processor 510. A part of the memory 520 may further include a non-volatile RAM. For example, the memory 520 may further store device type information.

The bus system 530 may include a power bus, a control bus, a status signal bus, and the like in addition to a data bus. However, for clear description, various types of buses in the figure are marked as the bus system 530.

In an implementation process, the steps of the foregoing method may be completed by using an integrated logical circuit of hardware in the processor 510 or an instruction in a form of software. Steps of the method disclosed with reference to the embodiments of the present disclosure may be directly performed and completed by means of a hardware processor, or may be performed and completed by using a combination of hardware and software modules in the processor. The software module may be located in a mature storage medium in the field, such as a RAM, a flash memory, a ROM, a programmable ROM, an electrically-erasable programmable memory, or a register. The storage medium is located in the memory 520, and the processor 510 reads information in the memory 520 and completes the steps of the foregoing method in combination with hardware of the processor 510. To avoid repetition, details are not described herein again.

Therefore, in this embodiment of the present disclosure, the controller establishes, according to a request signal that is sent by the first transmitter and that is used to request to send an optical signal to the second receiver, by controlling an optical switch in the OSN, a second optical path that connects the first transmitter to the second receiver in the OSN; sends, to the second receiver according to the request signal, a reset signal used to instruct the second receiver to be reset to an initial state; and sends, while or after sending the reset signal, to the first transmitter, an acknowledgement signal used to instruct the first transmitter to send an optical signal to the second receiver by using the second optical path, thereby sending the reset signal to the second receiver in a timely manner, so that the second receiver is reset to an initial state before receiving an optical signal sent by the first transmitter. Therefore, a response time of receiving a new optical signal by the second receiver can be effectively shortened, and utilization of the OSN is improved.

It should be understood that, the controller 500 according to this embodiment of the present disclosure may correspond to the controller of the OSN in the signal transmission method according to the embodiments of the present disclosure, and may correspond to the controller 400 according to the embodiment of the present disclosure. In addition, the foregoing and other operations and/or functions of the modules of the controller 500 are respectively for implementing corresponding processes of methods from FIG. 1 to FIG. 6. For concision, details are not described herein again.

Figure 9:
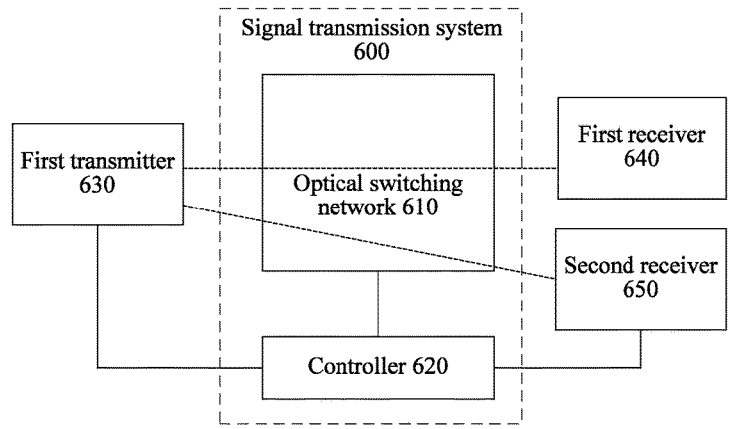
FIG. 9 is a schematic block diagram of a signal transmission system according to an embodiment of the present disclosure.

As shown in FIG. 9, an embodiment of the disclosure further provides a signal transmission system 600 based on an OSN. The system 600 includes: an OSN 610, where a first optical path that connects a first transmitter 630 to a first receiver 640 exists in the OSN; and a controller 620, configured to control the OSN 610, where the controller 620 is configured to: receive a request signal sent by the first transmitter 630, where the request signal is used to request to send an optical signal to a second receiver 650; establish, according to the request signal, by controlling an optical switch in the OSN 610, a second optical path that connects the first transmitter 630 to the second receiver 650 in the OSN 610; send, to the second receiver 650 according to the request signal, a reset signal used to instruct the second receiver 650 to be reset to an initial state; and send, after or while sending the reset signal, an acknowledgement signal to the first transmitter 630, where the acknowledgement signal is used to instruct the first transmitter 630 to send, by using the second optical path, an optical signal to the second receiver 650.

Therefore, in this embodiment of the present disclosure, the controller establishes, according to a request signal that is sent by the first transmitter and that is used to request to send an optical signal to the second receiver, by controlling an optical switch in the OSN, a second optical path that connects the first transmitter to the second receiver in the OSN; sends, to the second receiver according to the request signal, a reset signal used to instruct the second receiver to be reset to an initial state; and sends, while or after sending the reset signal, to the first transmitter, an acknowledgement signal used to instruct the first transmitter to send an optical signal to the second receiver by using the second optical path, thereby sending the reset signal to the second receiver in a timely manner, so that the second receiver is reset to an initial state before receiving an optical signal sent by the first transmitter. Therefore, a response time of receiving a new optical signal by the second receiver can be effectively shortened, and utilization of the OSN is improved.

It should be understood that, the first transmitter 630 is configured to send, to the controller 610, a request signal used to send an optical signal to the second receiver 650; and send, according to an acknowledgement signal sent by the controller 620, an optical signal to the second receiver 650 by using the second optical path.

The second receiver 650 is configured to be reset to an initial state according to the reset signal; and receive, by using the second optical path, the optical signal sent by the first transmitter 630.

It should be understood that, the receiver in this embodiment of the present disclosure is shown in FIG. 4, and is described in the foregoing, and details are not described herein again.

Optionally, in this embodiment of the present disclosure, the controller is specifically configured to establish the second optical path when it is determined that the second optical path is idle.

Optionally, in this embodiment of the present disclosure, the controller is specifically configured to send, according to the request signal, the reset signal to a reset port of an LA of the second receiver.

The controller is connected to the reset port of the LA of the second receiver, to send the reset signal to the reset port of the LA of the second receiver.

Optionally, in this embodiment of the present disclosure, the controller is specifically configured to send, according to the request signal, the reset signal to a reset port of a TIA and/or a reset port of CDR of the second receiver.

Specifically, the controller is connected to the reset port of the TIA and/or the reset port of the CDR of the second receiver, to send the reset signal to the reset port of the TIA and/or the reset port of the CDR of the second receiver.

Optionally, in this embodiment of the present disclosure, the controller is specifically configured to send, according to the request signal, the reset signal to a reset signal generator of the second receiver.

The controller is connected to the reset signal generator of the second receiver, and sends, by using the reset signal generator, the reset signal to the second receiver.

Optionally, in this embodiment of the present disclosure, the controller is further configured to disconnect, according to the request signal, the first optical path by controlling an optical switch in the OSN.

Optionally, in this embodiment of the present disclosure, the at least one transmitter is a burst transmitter, and the at least two receivers are burst receivers that use direct current coupling.

Therefore, in this embodiment of the present disclosure, the controller establishes, according to a request signal that is sent by the first transmitter and that is used to request to send an optical signal to the second receiver, by controlling an optical switch in the OSN, a second optical path that connects the first transmitter to the second receiver in the OSN; sends, to the second receiver according to the request signal, a reset signal used to instruct the second receiver to be reset to an initial state; and sends, while or after sending the reset signal, to the first transmitter, an acknowledgement signal used to instruct the first transmitter to send an optical signal to the second receiver by using the second optical path, thereby sending the reset signal to the second receiver in a timely manner, so that the second receiver is reset to an initial state before receiving an optical signal sent by the first transmitter. Therefore, a response time of receiving a new optical signal by the second receiver can be effectively shortened, and utilization of the OSN is improved.

It should be understood that, the controller 610 in the signal transmission system 600 based on the OSN according to this embodiment of the present disclosure may correspond to the controller of the OSN in the signal transmission method according to the embodiments of the present disclosure, and may correspond to the controllers 400 and 500 according to the embodiments of the present disclosure. The first transmitter 620 in the system 600 may correspond to the first transmitter in the signal transmission method according to the embodiments of the present disclosure. The second receiver 640 in the system 600 may correspond to the second receiver in the signal transmission method according to the embodiments of the present disclosure. In addition, the foregoing and other operations and/or functions of the modules of the signal transmission system 600 are respectively for implementing processes corresponding to the methods in FIG. 1 to FIG. 6. For concision, details are not described herein again.

Figure 10:
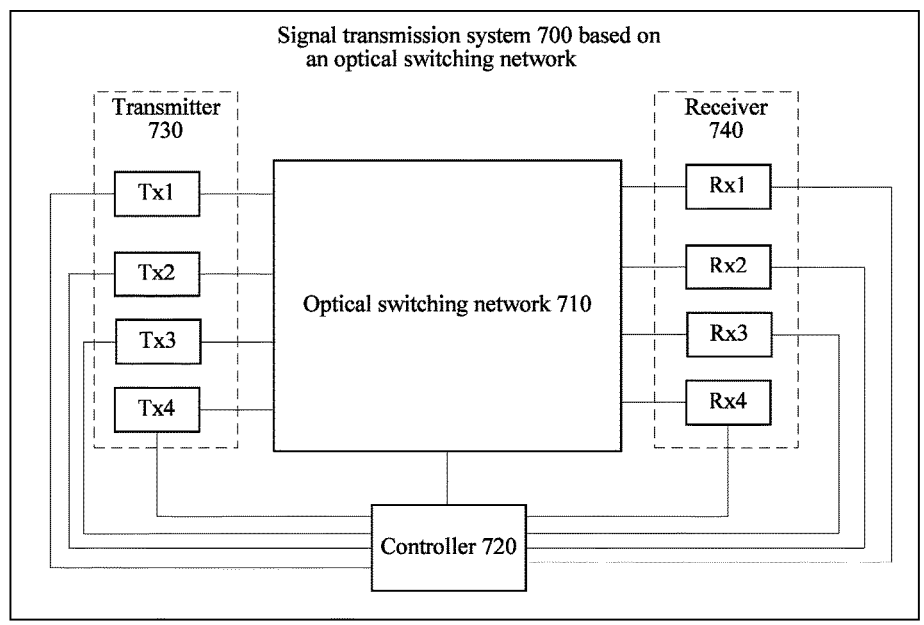
FIG. 10 is another schematic block diagram of a signal transmission system according to an embodiment of the present disclosure.

FIG. 10 shows a signal transmission system 700 based on an OSN according to an embodiment of the present disclosure. The system 700 includes: an OSN 710, a controller 720, at least one transmitter 730 (including four transmitters Tx1 to Tx4 shown in FIG. 10) and at least one receiver 740 (including four receivers Rx1 to Rx4 shown in FIG. 10), where the transmitter 730 and the receiver 740 are connected to the OSN 710 by using an optical path (an optical fiber or an optical waveguide), the transmitter 730 and the receiver 740 are connected to the controller 720 by using a circuit or an optical path, and the controller 720 is connected to the OSN 710 by using a circuit.

Figure 11:
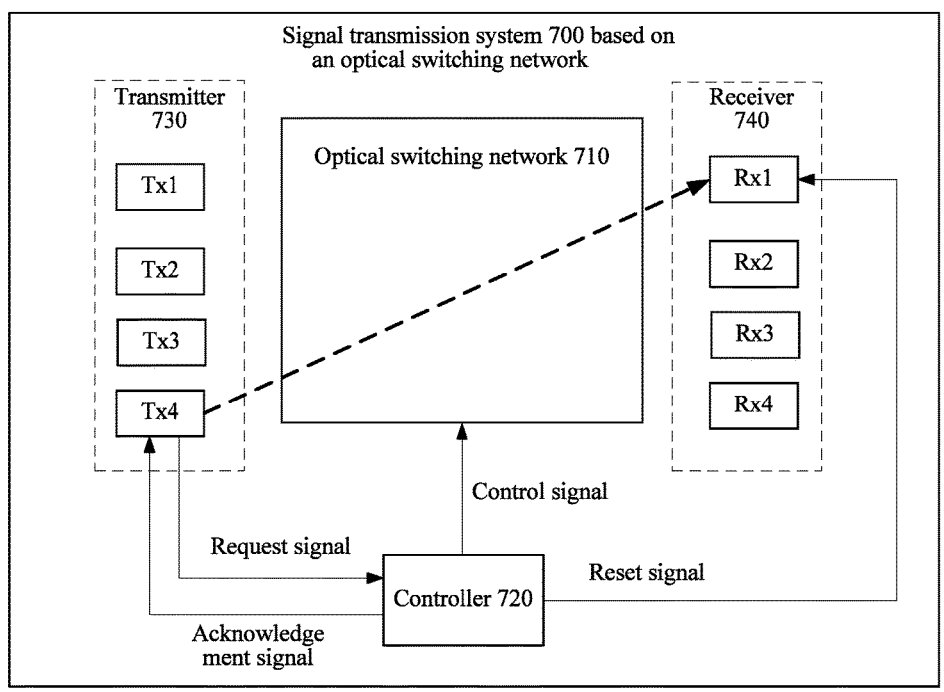
FIG. 11 is still another schematic block diagram of a signal transmission system according to an embodiment of the present disclosure.

As shown in FIG. 11, it is assumed that at a moment t1, Tx4 sends a signal to Rx4, and Tx1 sends a signal to Rx1; at a moment t2, Tx4 needs to communicate with Rx1, Tx4 sends a request signal to the controller 720, the controller 720 determines, after receiving the request signal, an optical path from Tx4 to Rx1 is not occupied, and the controller 720 sends a control signal to the OSN, configures the optical path from Tx4 to Rx1, and at the same time, sends a reset signal to Rx1, to instruct Rx1 to be reset to an initial state; and replies, after or while sending the reset signal, to Tx4 with an acknowledgement signal (by using a same line as that Tx4 sends a request signal by using, and two lines are drawn in FIG. 11 for easier understanding). Tx4 sends, after receiving the acknowledgement signal, an optical burst to Rx1, thereby finishing one-time burst transmission.

It should be understood that, the OSN 710 in FIG. 10 corresponds to the OSN 610 in FIG. 6, and the controller 720 in FIG. 10 corresponds to the controller 620 in FIG. 9. The at least one transmitter 730 in FIG. 10 includes the first transmitter 630 in FIG. 9, and the at least one receiver 740 in FIG. 10 includes the first receiver 640 and the second receiver 650 in FIG. 9.

Therefore, in this embodiment of the present disclosure, the controller establishes, according to a request signal that is sent by the first transmitter and that is used to request to send an optical signal to the second receiver, by controlling an optical switch in the OSN, a second optical path that connects the first transmitter to the second receiver in the OSN; sends, to the second receiver according to the request signal, a reset signal used to instruct the second receiver to be reset to an initial state; and sends, while or after sending the reset signal, to the first transmitter, an acknowledgement signal used to instruct the first transmitter to send an optical signal to the second receiver by using the second optical path, thereby sending the reset signal to the second receiver in a timely manner, so that the second receiver is reset to an initial state before receiving an optical signal sent by the first transmitter. Therefore, a response time of receiving a new optical signal by the second receiver can be effectively shortened, and utilization of the OSN is improved.

It should be further understood that, the first, second, and various numbers in this specification are merely for distinguishing for convenient description, and are not intended to limit the scope of the embodiments of the present disclosure.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A signal transmission method, wherein the method is applied to an optical transmission system that comprises an optical switching network (OSN) and a controller that is coupled to the OSN and configured to control the OSN, wherein the OSN comprises a first optical path that connects a first transmitter to a first receiver, and wherein the method comprises:
  receiving, by the controller, a request signal from the first transmitter, wherein the request signal is used to request to send an optical signal to a second receiver;
  establishing, by the controller, according to the request signal and by controlling an optical switch in the OSN, a second optical path that connects the first transmitter to the second receiver in the OSN;
  sending, by the controller to the second receiver according to the request signal, a reset signal used to instruct the second receiver to be reset to an initial state; and
  sending, by the controller, an acknowledgement signal to the first transmitter, wherein the acknowledgement signal is used to instruct the first transmitter to send, using the second optical path, the optical signal to the second receiver.

2. The method according to claim 1, wherein sending, by the controller, the acknowledgement signal to the first transmitter comprises sending, by the controller, the acknowledgement signal to the first transmitter after the controller sends the reset signal.

3. The method according to claim 1, wherein sending, by the controller, the acknowledgement signal to the first transmitter comprises sending, by the controller, the acknowledgement signal to the first transmitter while the controller is sending the reset signal.

4. The method according to claim 1, wherein the method further comprises disconnecting, by the controller according to the request signal, the first optical path by controlling an optical switch in the first optical path.

5. A signal transmission system, wherein the system comprises:
   an optical switching network (OSN) comprising a first optical path that connects a first transmitter to a first receiver; and
   a controller coupled to the OSN and configured to:
      receive a request signal from the first transmitter, wherein the request signal is used to request to send an optical signal to a second receiver;
      establish, according to the request signal and by controlling an optical switch in the OSN, a second optical path that connects the first transmitter to the second receiver in the OSN;
      send, to the second receiver according to the request signal, a reset signal used to instruct the second receiver to be reset to an initial state; and
      send an acknowledgement signal to the first transmitter, wherein the acknowledgement signal is used to instruct the first transmitter to send, using the second optical path, the optical signal to the second receiver.

6. The system according to claim 5, wherein the controller is further configured to send the acknowledgement signal to the first transmitter after sending the reset signal.

7. The system according to claim 5, wherein the controller is further configured to send the acknowledgement signal to the first transmitter while sending the reset signal.

8. The system according to claim 5, wherein the controller is further configured to disconnect, according to the request signal, the first optical path by controlling an optical switch in the first optical path.

9. A controller, comprising:
   a memory storing instructions; and
   a processor coupled to the memory and configured to process the instructions to cause the processor to:
      receive a request signal from a first transmitter coupled to a first receiver via a first optical path in an optical switching network (OSN), wherein the request signal is used to request to send an optical signal to a second receiver;
      establish, according to the request signal and by controlling an optical switch in the OSN, a second optical path that connects the first transmitter to the second receiver in the OSN;
      send, to the second receiver according to the request signal, a reset signal used to instruct the second receiver to be reset to an initial state; and
      send an acknowledgement signal to the first transmitter, wherein the acknowledgement signal is used to instruct the first transmitter to send, by using the second optical path, an optical signal to the second receiver.

10. The controller according to claim 9, wherein the instructions, when processed by the processor, cause the processor to send the acknowledgement signal to the first transmitter after the transmitter sends the reset signal.

11. The controller according to claim 9, wherein the instructions, when processed by the processor, cause the processor to send the acknowledgement signal to the first transmitter while the transmitter is sending the reset signal.

12. The controller according to claim 9, wherein the instructions, when processed by the processor, further cause the processor to disconnect, according to the request signal, the first optical path by controlling an optical switch in the first optical path.

13. The controller according to claim 9, wherein the instructions, when processed by the processor, cause the processor to send, to a reset port of a limited amplifier (LA) of the second receiver according to the request signal, a reset signal used to instruct the LA to be reset to the initial state.

14. The controller according to claim 9, wherein the instructions, when processed by the processor, cause the processor to send, to a reset port of a trans-impedance amplifier (TIA) of the second receiver according to the request signal, a reset signal used to instruct the TIA to be reset to the initial state.

15. The controller according to claim 9, wherein the instructions, when processed by the processor, cause the processor to send, to a reset port of a clock and data recovery (CDR) of the second receiver according to the request signal, a reset signal used to instruct the CDR to be reset to the initial state.

* * * * *